United States Patent
Hansmann

(10) Patent No.: US 10,525,951 B2
(45) Date of Patent: Jan. 7, 2020

(54) VEHICLE BRAKING SYSTEM AND METHOD OF OPERATING THE SAME

(71) Applicant: Robert Bosch GmbH, Stuttgart (DE)

(72) Inventor: Simon Hansmann, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 41 days.

(21) Appl. No.: 15/836,087

(22) Filed: Dec. 8, 2017

(65) Prior Publication Data

US 2019/0176785 A1  Jun. 13, 2019

(51) Int. Cl.
*B60T 7/06* (2006.01)
*B60T 8/40* (2006.01)
*B60R 21/09* (2006.01)
*B60T 13/14* (2006.01)
*B60T 13/68* (2006.01)
*B60T 13/74* (2006.01)

(52) U.S. Cl.
CPC .............. *B60T 8/40* (2013.01); *B60R 21/09* (2013.01); *B60T 7/065* (2013.01); *B60T 13/145* (2013.01); *B60T 13/686* (2013.01); *B60T 13/741* (2013.01); *B60T 2201/03* (2013.01)

(58) Field of Classification Search
CPC .......... B60T 13/745; B60T 7/06; B60T 7/065; B60R 21/09
See application file for complete search history.

(56) References Cited

U.S. PATENT DOCUMENTS

| | | |
|---|---|---|
| 3,373,661 A | 3/1968 | Reichard |
| 4,076,093 A | 2/1978 | Mizuno |
| 6,316,897 B1 | 11/2001 | Ewing |
| 7,650,212 B2 | 1/2010 | Breed et al. |
| 8,145,388 B2 | 3/2012 | Kusunoki |
| 8,670,891 B1 * | 3/2014 | Szybalski .............. B62D 1/286 701/23 |
| 9,254,827 B2 | 2/2016 | Weiberle et al. |
| 9,266,507 B2 | 2/2016 | Shand et al. |
| 2010/0179715 A1 * | 7/2010 | Puddy .................. G05D 1/0061 701/23 |
| 2011/0238267 A1 | 9/2011 | Cetinkaya |
| 2015/0137492 A1 * | 5/2015 | Rao ....................... B60R 21/017 280/729 |

(Continued)

FOREIGN PATENT DOCUMENTS

| EP | 1488961 A1 | 12/2004 |
|---|---|---|
| GB | 2522314 A * | 7/2015 |

*Primary Examiner* — Bradley T King

(74) *Attorney, Agent, or Firm* — Michael Best & Friedrich LLP

(57) ABSTRACT

A vehicle braking system includes a wheel cylinder, a master cylinder including a master cylinder piston operable to translate between an unactuated position and an actuated position in a first mode of operation, a brake pedal operable to transition between an extended position corresponding to the unactuated position of the master cylinder and a retracted position corresponding to the actuated position of the master cylinder, and a booster located between the master cylinder and the brake pedal. The master cylinder is operable to selectively transfer a braking force from the brake pedal to the wheel cylinder in the first mode of operation. The booster is operable to hold the brake pedal in the retracted position in a second mode of operation without user input and without associated braking.

20 Claims, 2 Drawing Sheets

(56) References Cited

U.S. PATENT DOCUMENTS

| | | | |
|---|---|---|---|
| 2015/0360666 A1* | 12/2015 | Gerdes | B60T 7/06 |
| | | | 60/545 |
| 2017/0217418 A1* | 8/2017 | Ganzel | B60T 7/042 |
| 2017/0259797 A1* | 9/2017 | Serrano | B60T 7/042 |
| 2017/0361825 A1* | 12/2017 | Drumm | B60T 8/363 |
| 2018/0186266 A1* | 7/2018 | Fitzpatrick | B60N 3/063 |
| 2018/0189716 A1* | 7/2018 | Crone | G06Q 10/08355 |
| 2018/0290640 A1* | 10/2018 | Johnson | B60T 7/042 |
| 2018/0326965 A1* | 11/2018 | Yamamoto | B60T 8/4059 |
| 2019/0001942 A1* | 1/2019 | Spieker | B60T 8/173 |
| 2019/0001949 A1* | 1/2019 | Ying | B60T 8/4081 |

* cited by examiner

VEHICLE BRAKING SYSTEM AND METHOD OF OPERATING THE SAME

BACKGROUND

The present disclosure relates to vehicle braking systems. In particular, the invention relates to a vehicle braking system for use in highly autonomous driving modes.

SUMMARY

In one aspect, a vehicle braking system includes a wheel cylinder, a master cylinder including a master cylinder piston operable to translate between an unactuated position and an actuated position in a first mode of operation, a brake pedal operable to transition between an extended position corresponding to the unactuated position of the master cylinder and a retracted position corresponding to the actuated position of the master cylinder, and a booster located between the master cylinder and the brake pedal. The master cylinder is operable to selectively transfer a braking force from the brake pedal to the wheel cylinder in the first mode of operation. The booster is operable to hold the brake pedal in the retracted position in a second mode of operation without user input and without associated braking.

In another aspect, a method of operating a vehicle braking system includes providing a brake pedal coupled to a master cylinder, the brake pedal positioned in an extended position present for use, moving the brake pedal to a retracted position, without applying braking, to define a stowed condition, holding the brake pedal in the stowed condition without associated braking, automatically identifying a braking trigger with a controller, and generating a signal from the controller in response to the identification of the braking trigger, and generating a pressure at a wheel cylinder based on the signal, the magnitude of the pressure being irrespective of the position of the brake pedal and generated without use of the brake pedal.

In yet another aspect, a vehicle braking system includes a wheel cylinder, a brake pedal operable to transition between an extended position in which the brake pedal is presented for use and a retracted position in which the brake pedal is stowed, and a pedal hold down device operable to retain the brake pedal in the retracted position. In a first mode of operation, the brake pedal is actuatable from the extended position toward the retracted position and the vehicle braking system is operable to provide a variable braking force associated with the position of the brake pedal. In a second mode of operation, the pedal hold down device retains the brake pedal in the retracted position without an associated braking force and the vehicle braking system is operable to provide a variable braking force irrespective of the position of the brake pedal.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
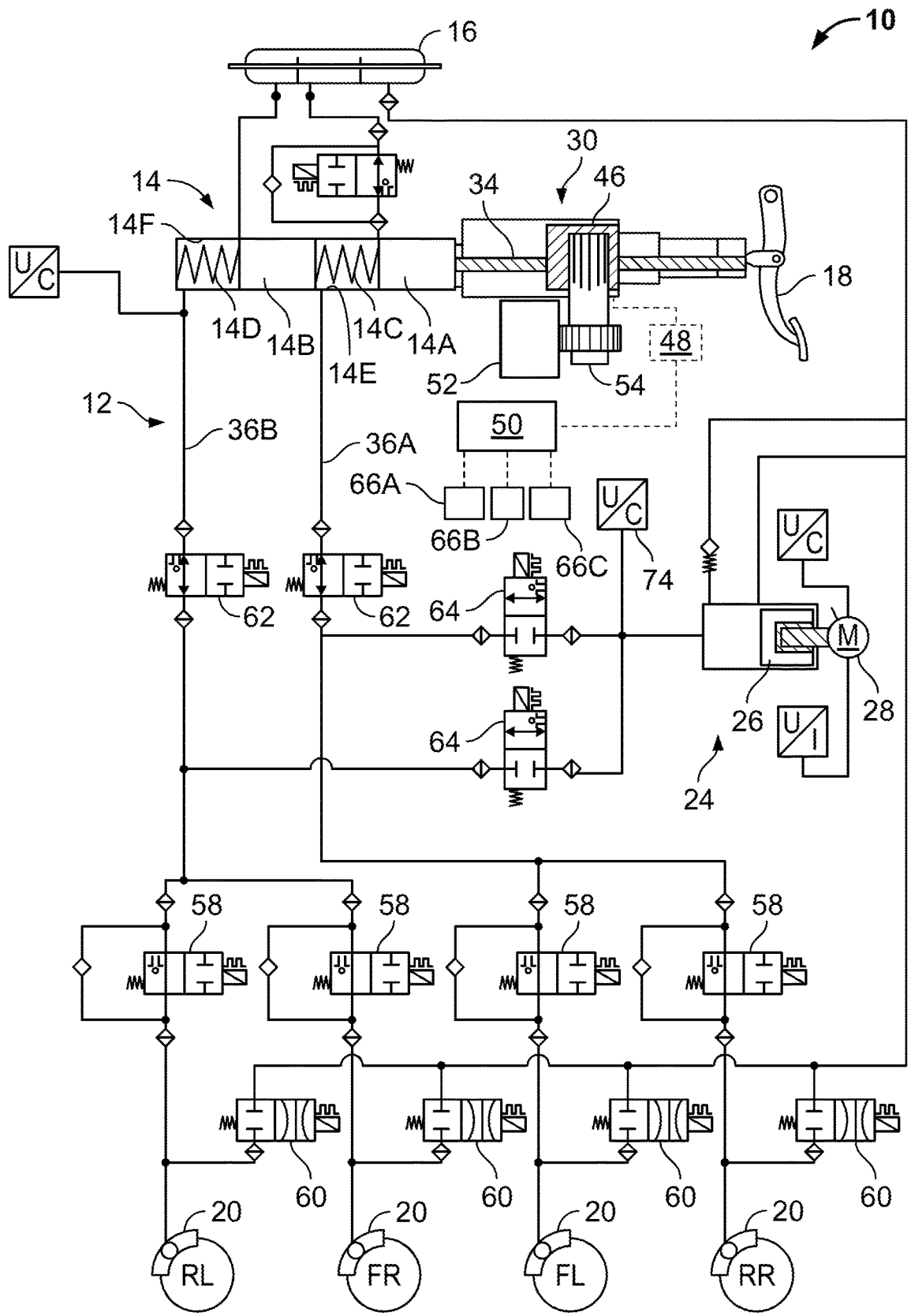
FIG. 1 is a schematic view of a vehicle braking system including a brake pedal and a braking unit.

FIG. 1 illustrates a vehicle braking system 10. The braking system 10 includes a braking unit 12, a fluid reservoir 16, an input device such as a brake pedal 18, and a plurality of wheel cylinders 20 (as shown, the vehicle braking system 10 includes four wheel cylinders 20, each wheel cylinder 20 associated with a wheel of the vehicle) connected to the braking unit 12. The braking unit 12 pressurizes hydraulic fluid to achieve a braking force at the wheel cylinders 20 and includes a master cylinder 14, an electromechanical brake booster 30, and further includes an electronically controlled pressure generation unit 24 separate from the master cylinder 14 and booster 30. The master cylinder 14 (alone or boosted by the booster 30) and the electronically controlled pressure generation unit 24 are two distinct fluid suppliers for applying braking force through fluid pressure to the wheel cylinders 20.

The master cylinder 14 is a tandem master cylinder including two master cylinder pistons 14A, 14B biased toward a front of the master cylinder 14 via master cylinder return springs 14C, 14D. The pistons 14A, 14B delineate the interior of the master cylinder 14 into a first chamber 14E and a second chamber 14F. Each chamber 14E, 14F of the master cylinder 14 is in selective fluid communication with a circuit 36A, 36B for one or more of the wheel cylinders 20. An input rod 34 connects the master cylinder 14 to the brake pedal 18 with the brake booster 30 mounted adjacent thereto to modify the force applied at the brake pedal 18.

Figure 2A:
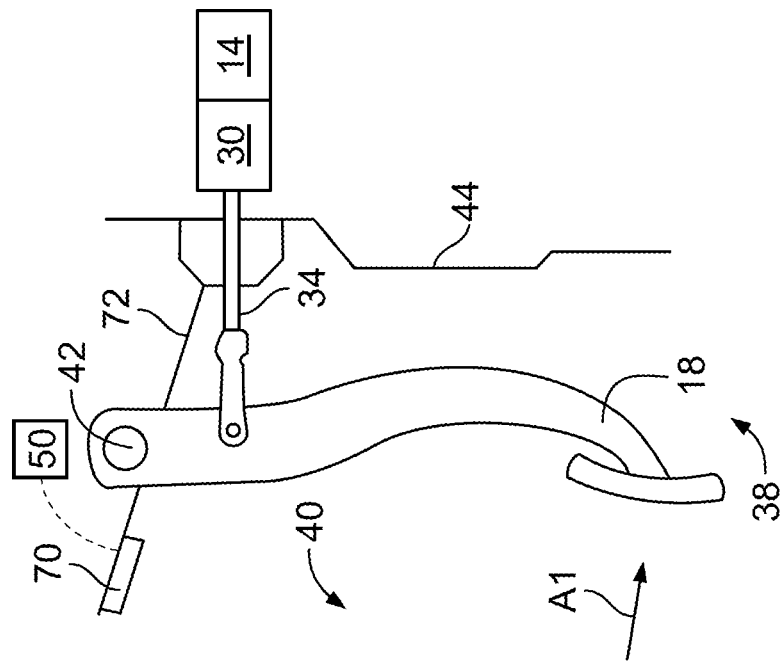
FIG. 2A is a side view of the brake pedal of the vehicle braking system of FIG. 1 in an extended position.
Figure 2B:
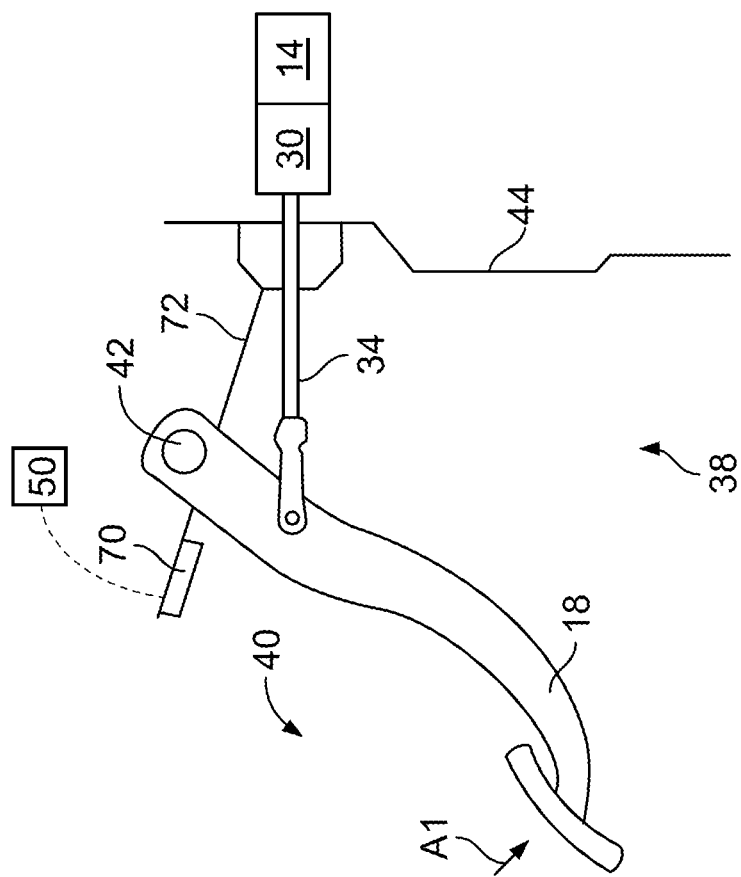
FIG. 2B is a side view of the brake pedal in a retracted position.

As shown in FIGS. 2A and 2B, the brake pedal 18 is mounted within a footwell 38 of an operator cabin 40. A firewall 44 separates the pedal 18 from the master cylinder 14 and the booster 30 with the input rod 34 extending through the firewall 44 to connect the pedal 18 to the master cylinder 14. The pedal 18 is operable to transition from an extended position (FIG. 2A) toward a retracted position (FIG. 2B) via a user force (i.e., from the foot of a user) indicated by arrow A1. The pedal 18 is biased to the extended position by the spring force of the master cylinder return springs 14C, 14D. To actuate the brake pedal 18, a user depresses the brake pedal 18 from the extended position toward the firewall 44 and toward the retracted position. This motion corresponds to and produces a translation of the master cylinder pistons 14A, 14B against the return springs 14C, 14D. The motion of the brake pedal 18 between the extended and retracted positions is rotational about a pivot point 42, though the motion may include an aspect of translation as well. The retracted position corresponds to an actuated position and not merely to an adjustment for driver comfort. The extended position corresponds to a position in which the pedal 18 is presented for engagement by the driver.

Referring again to FIG. 1, the electromechanical brake booster 30 is a vacuum-independent brake booster 30 (i.e., the booster 30 is not a vacuum booster). The input rod 34 moves in relation to a boost body 46. A differential travel sensor 48 measures this relative movement and transmits it to a controller 50. The controller 50 calculates the control signals for an electric motor 52. A gear unit 54 converts the torque into a force that supports the driver when braking by boosting the force applied by the user at the brake pedal 18. The power supplied by the booster 30 is converted by the master cylinder 14 into hydraulic pressure. In adaptive cruise control, the presence of a motor 52 and gear unit 54 in the booster 30 allows the booster 30 to build up the brake pressure without the brake pedal 18 being applied (i.e., without user input). The electromechanical brake booster 30 may be, for example, Bosch's iBooster (available from Robert Bosch GmbH. of Stuttgart, Germany). In other constructions, the electromechanical brake booster 30 can be a different booster capable of actuating the brake pedal 18.

The pressure generation unit 24 is operable to generate a braking force at the wheel cylinders 20 in a brake-by-wire mode of operation, in which the master cylinder 14 does not provide a braking force to the wheel cylinders 20. As shown, the electronically controlled pressure generation unit 24 includes a plunger 26 driven by an electric motor 28 to displace fluid throughout the braking unit 12. The electrically controlled pressure generating unit 24 can otherwise by any of a number of electrically controlled pressure generation units operable with brake-by-wire braking systems.

The braking unit 12 further includes a plurality of valves, specifically: inlet valves 58 and outlet valves 60. The braking unit 12 shown in FIG. 1 includes four inlet valves 58 and four outlet valves 60, one of each valve 58, 60, associated with each of the wheel cylinders 20. The inlet valves 58 are located between the respective wheel cylinder 20 and the fluid suppliers 14, 24. The outlet valves 60 are located between the wheel cylinder 20 and the reservoir 16. The inlet valves 58 are normally open valves and the outlet valves 60 are normally closed valves. The valves 58, 60 are selectively manipulated (opened and closed to varying degrees via feedback from sensors, etc.) to control aspects of braking such as an anti-lock braking system (ABS), traction control, or an electronic stability program (ESP).

The braking unit 12 further includes a normally-open separation valve 62 in each brake circuit 36A, 36B (i.e., corresponding to each master cylinder chamber 14E, 14F) to selectively disconnect or connect a brake fluid flow path between the master cylinder 14 and the respective wheel cylinders 20. Further still, normally-closed control valves 64 are located between the pressure generation unit 24 and the wheel cylinders 20 to likewise selectively connect or disconnect a fluid path between the pressure generation unit 24 and the wheel cylinders 20. Alternatively, the separation valves 62 and the control valves 64 may be combined into a single valve per circuit 36A, 36B that switches the input to the wheel cylinders 20 between the master cylinder 14 and the pressure generation unit 24.

The vehicle braking system 10 further includes a controller 50. Various individual components (e.g., the pressure generation unit 24, etc.) of the braking system 10 may include respective controllers. Through communication with one another, these controllers collectively function together and are described below as the controller 50. The controller 50 receives signals measured or detected by various sensors 66A, 66B, 66C indicative of braking triggers such as ambient conditions or driver inputs in and around the vehicle. Some of these ambient conditions may include road condition (wet, icy, gravel), weather conditions (raining, snowing, temperature, humidity), proximity to nearby objects (other vehicles, lane markings), pressure within the braking unit prior to braking actuation (e.g., as measured by pressure sensor 74), and tire conditions (tire pressure, tread depth). Driver input may include physical inputs to vehicle components (at the brake pedal 18, at the accelerator, at the steering wheel), and mode selection (comfort mode, sport mode, performance mode, autonomous mode). With this information, the controller 50 is operable to modify braking characteristics of the braking system 10 as described below.

In normal operation, the vehicle braking system 10 is operable to provide a braking force at the wheel cylinders 20 in three ways: non-boosted, boosted, and brake-by-wire braking. In non-boosted braking, the operator applies a force to the brake pedal 18, rotating the pedal 18 from the extended position toward the retracted position. This motion translates the input rod 34 and the master cylinder pistons 14A, 14B against the force of the master cylinder return springs 14C, 14D. Brake fluid within the master cylinder chambers 14E, 14F is expelled from the master cylinder 14 and into the respective circuits 36A, 36B. With the separation valves 62 in an open position, the pressure generated within the master cylinder 14 produces a braking force at the wheel cylinders 20, through the open inlet valves 58.

In boosted braking, the operator applies a force to the brake pedal 18, rotating the pedal 18 from the extended position toward the retracted position. This motion translates the input rod 34. The translation of the input rod 34 is registered by the differential travel sensor 48, and the electric motor 52 and gear unit 54 generate a torque to increase the force applied to the master cylinder pistons 14A, 14B. The boost force generated by the booster 30 can be varied by the controller 50 based on operating or ambient conditions or driver input. The master cylinder pistons 14A, 14B are displaced against the master cylinder return springs 14C, 14D. Brake fluid within the master cylinder chambers 14E, 14F is expelled from the master cylinder 14 and into the respective circuits 36A, 36B. With the separation valves 62 in an open position, the pressure generated within the master cylinder 14 produces a braking force at the wheel cylinders 20, through the open inlet valves 58.

In brake-by-wire braking, the operator applies a force to the brake pedal 18, rotating the pedal 18 from the extended position toward the retracted position. This motion translates the input rod 34. The booster 30 may be actuated to prevent actuation of the master cylinder pistons 14A, 14B. Alternatively, with minor modifications to the valving between the master cylinder 14 and the reservoir 16, the pressure generated in the master cylinder 14 by the driver input force may be bled off to the reservoir 16. A sensor (e.g., the differential travel sensor 48 of the booster 30, a standalone pressure or displacement sensor, etc.) measures the input and sends a signal to the controller 50. The controller 50 activates the motor 28 of the electronically controlled pressure generation unit 24, thereby displacing the plunger 26. With the control valves 64 in an open position, the pressure generated by the electronically controlled pressure generation unit 24 produces a braking force at the wheel cylinders 20, through the open inlet valves 58. The control valves 64 can be opened to varying degrees to set and control circuit pressures and wheel cylinder pressures.

In autonomous braking, such as adaptive cruise control, collision avoidance, or stability control, the vehicle braking system 10 may be operable to use the booster 30 or pressure generation unit 24 as described above, but without user input to the brake pedal 18. Instead, a sensor reading indicative of an ambient condition or driver input may be analyzed by the controller 50 to provide an input to the booster 30 (boosted mode) or the pressure generation unit 24 (brake-by-wire mode) without the driver actuating the brake pedal 18.

In high or full automation vehicles (i.e., SAE autonomy levels 4 and 5), in which the vehicle requires no input from a driver along a drive to a destination, it may be desired to retract the brake pedal 18 to avoid accidental depression of the pedal 18 and to provide additional leg room for the driver.

In operation, to stow the brake pedal 18 in the retracted position, the vehicle is placed into an autonomous driving mode in which the operator is not required to utilize the brake pedal 18. The operator may initialize the autonomous driving mode by setting a destination or actuating an input 70 within the vehicle cabin 40. As shown, the input 70 is a button or switch mounted to the underside of a dashboard 72, though the actuator may be otherwise mounted throughout the cabin 40 (e.g., on a door panel, on a vehicle seat, center console, integrated with the onboard computer/entertainment center/climate control system, etc.). Alternatively, the vehicle may default to an autonomous driving mode. Once the autonomous driving mode is selected, the controller 50 operates the booster 30 as a pedal hold down device to hold the pedal in the retracted position and stowed condition against or adjacent to the firewall 44 and out of the way of the vehicle operator. The controller 50 actuates the motor 52 and gear unit 54 of the brake booster 30 to retract the brake pedal 18 from the biased, extended position to the retracted position where the pedal 18 is stowed and held. Actuating the booster 30 to retract the pedal 18 displaces the pistons 14A, 14B within the master cylinder 14. In order to avoid a build-up of pressure (and associated braking force) at the wheel cylinders 20 created by the displaced pistons 14A, 14B, the separation valves 62 and outlet valves 60 are in open positions while the pedal 18 is being retracted to route the fluid to the reservoir 16. Alternatively, a fluid return line may be located between the master cylinder 14 and the separation valves 62. With the separation valves 62 in the closed position, this likewise routes the fluid expelled from the master cylinder 14 to the reservoir 16. To hold the pedal 18 in the retracted position, the booster 30 remains energized to overcome the spring force produced by the master cylinder return springs 14C, 14D. Alternatively, frictional forces within the gear unit 54 and motor 52 may prevent a return movement of the pedal 18 without additional energization of the motor 52. As an additional alternative, a separate lock-out or hold down device may be used to physically restrain the brake pedal 18 in the retracted position, such that the motor 52 can be de-energized while the brake pedal 18 is maintained in the retracted position.

The brake pedal 18 remains in the stowed condition and retracted position during the commute of the vehicle in the autonomous driving mode, regardless of any braking force being applied at the wheel cylinders 20. When a braking action is required based on input from the sensors 66A, 66B, 66C to the controller 50, the electronically controlled pressure generation unit 24 functions similar to the brake-by-wire mode described above. The controller 50 opens the control valves 64 and actuates the motor 28 of the pressure generation unit 24 to displace the plunger 26 an amount, thereby producing a braking force at the wheel cylinders 20 based on the sensor readings and corresponding desired braking characteristics (i.e., time to stop, rate of deceleration, etc.). In some constructions, the booster 30 may simultaneously function as a hold down device and respond to braking commands from the controller 50 to provide the requested braking force at the wheel cylinders 30. In such a construction, upon a braking request, the brake pedal 18 would start in the stowed position and move within a range of retracted or stowed positions as the booster is actuated to provide the requested braking.

When the autonomous driving mode is deactivated, whether by a completion of the requested route, a scenario detected by the vehicle sensors 66A, 66B, 66C in which autonomous driving is no longer acceptable (e.g., pressure loss at the pressure generation unit), or by manual input by the operator, the brake pedal 18 is released by the booster 30, returning to the biased position so that the brake pedal 18 is again presented for driver use in the extended position. In some constructions, if the master cylinder pistons 14A, 14B are displaced when the brake pedal 18 is in the stowed position, these pistons 14A, 14B likewise return to the biased position upon detection or manual input to end the autonomous driving mode as described above.

Various features of the disclosure are set forth in the following claims.

What is claimed is:

1. A vehicle braking system comprising:
    a wheel cylinder;
    a master cylinder including a master cylinder piston operable to translate between an unactuated position and an actuated position in a first mode of operation;
    a brake pedal operable to transition between an extended position corresponding to the unactuated position of the master cylinder and a retracted position corresponding to the actuated position of the master cylinder; and
    a booster located between the master cylinder and the brake pedal,
    wherein the master cylinder is operable to selectively transfer a braking force from the brake pedal to the wheel cylinder in the first mode of operation, and
    wherein the booster is operable to hold the brake pedal in the retracted position in a second mode of operation without user input and without associated braking.

2. The vehicle braking system of claim 1, wherein the booster is operable to boost the braking force generated by the master cylinder in the first mode of operation.

3. The vehicle braking system of claim 1, further comprising an electronically controlled pressure generation unit separate from the master cylinder and operable to generate a braking force at the wheel cylinder in the second mode of operation.

4. The vehicle braking system of claim 1, further comprising a valve positioned between the master cylinder and the wheel cylinder, wherein the valve is in a closed position in the second mode of operation.

5. The vehicle braking system of claim 1, wherein the second mode of operation is an autonomous driving mode, wherein in the autonomous driving mode the vehicle braking system is operable to generate a braking force without user input and the brake pedal is inoperable to provide the braking force to the wheel cylinder.

6. The vehicle braking system of claim 5, further comprising a controller programmed to transition the vehicle braking system from the first mode to the autonomous driving mode in response to a user input.

7. The vehicle braking system of claim 6, further comprising one or more sensors operable to detect a braking trigger, wherein the controller is programmed to transition the vehicle braking system from the second mode to the first mode in response to an input from the one or more sensors.

8. The vehicle braking system of claim 6, wherein the controller is programmed to transition the vehicle braking system from the second mode to the first mode in response to an input from the user or upon detecting that a desired braking pressure is not achieved.

9. A method of operating a vehicle braking system, the method comprising:
    providing a brake pedal coupled to a master cylinder, the brake pedal positioned in an extended position present for use and retractable along a path toward a retracted position when applying braking;

moving the brake pedal along the path toward the retracted position, without applying braking, to define a stowed condition;

holding the brake pedal in the stowed condition without associated braking;

automatically identifying a braking trigger with a controller, and generating a signal from the controller in response to the identification of the braking trigger; and generating a pressure at a wheel cylinder based on the signal, the magnitude of the pressure being irrespective of the position of the brake pedal and generated without use of the brake pedal.

10. The method of claim 9, further comprising disconnecting a brake fluid flow path between the master cylinder and the wheel cylinder.

11. The method of claim 9, further comprising energizing an electromechanical booster to move the brake pedal from the extended position to the stowed position.

12. The method of claim 11, further comprising inputting a command to the controller to retract the brake pedal prior to energizing the electromechanical booster, wherein inputting the command to the controller includes placing the vehicle into an autonomous driving mode.

13. The method of claim 9, further comprising inputting a command to the controller to release the brake pedal to the extended position wherein inputting the command to the controller includes exiting an autonomous driving mode.

14. A vehicle braking system comprising:
a wheel cylinder;
a brake pedal operable to transition along a path between an extended position in which the brake pedal is presented for use and a retracted position in which the brake pedal is stowed; and
a pedal hold down device operable to retain the brake pedal in the retracted position,
wherein, in a first mode of operation, the brake pedal is actuatable along the path from the extended position toward the retracted position and the vehicle braking system is operable to provide a variable braking force associated with the position of the brake pedal, and
wherein, in a second mode of operation, the pedal hold down device retains the brake pedal in the retracted position without an associated braking force and the vehicle braking system is operable to provide a variable braking force irrespective of the position of the brake pedal.

15. The vehicle braking system of claim 14, wherein the second mode of operation is an autonomous driving mode, wherein in the autonomous driving mode the vehicle braking system is operable to generate the variable braking force without user input.

16. The vehicle braking system of claim 14, further comprising a master cylinder and a valve positioned between the master cylinder and the wheel cylinder, wherein, in the second mode of operation, the valve disconnects a brake fluid flow path between the master cylinder and the wheel cylinder.

17. The vehicle braking system of claim 16, wherein the pedal hold down device is an electromechanical booster operable to boost the associated braking force in the first mode of operation and further operable to retract the brake pedal to the retracted position to transition the system into the second mode of operation.

18. The vehicle braking system of claim 17, further comprising an electrically controlled pressure generation unit separate from the master cylinder and the electromechanical booster and operable to generate a braking force at the wheel cylinder in the second mode of operation.

19. The vehicle braking system of claim 14, further comprising a master cylinder and an electrically controlled pressure generation unit separate from the master cylinder, wherein the electrically controlled pressure generation unit is operable to generate a braking force at the wheel cylinder in response to actuation of the brake pedal in the first mode of operation.

20. The vehicle braking system of claim 19, further comprising one or more sensors operable to detect a braking trigger, wherein the electronically controlled pressure generation unit is further operable to generate a braking force at the wheel cylinder in response to an input from the one or more sensors in the second mode of operation.

* * * * *